(12) United States Patent
Stepanov et al.

(10) Patent No.: US 6,272,165 B1
(45) Date of Patent: Aug. 7, 2001

(54) DISTRIBUTED FEEDBACK RING LASER

(75) Inventors: Dmitrii Yurievich Stepanov, Dulwich Hill; John Canning, Chippendale, both of (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/077,688

(22) PCT Filed: Nov. 28, 1996

(86) PCT No.: PCT/AU96/00765

§ 371 Date: Aug. 24, 1998

§ 102(e) Date: Aug. 24, 1998

(87) PCT Pub. No.: WO97/21260

PCT Pub. Date: Jun. 12, 1997

(30) Foreign Application Priority Data

Dec. 1, 1995 (AU) .................................................. PN6947

(51) Int. Cl.[7] .............................. H01S 3/08; H01S 3/067
(52) U.S. Cl. ................................. 372/94; 372/6; 372/19; 372/96
(58) Field of Search .................................. 372/94, 6, 96, 372/102, 19, 40, 70; 385/27, 32, 37, 39, 123; 359/341

(56) References Cited

U.S. PATENT DOCUMENTS

| 3,772,611 | | 11/1973 | Smith . | |
|---|---|---|---|---|
| 4,955,028 | * | 9/1990 | Alferness et al. | 372/20 |
| 5,052,015 | * | 9/1991 | Ackerman et al. | 372/96 |
| 5,052,016 | * | 9/1991 | Mahbobzadeh et al. | 372/96 |
| 5,159,601 | * | 10/1992 | Huber | 372/6 |
| 5,243,609 | | 9/1993 | Huber | 372/19 |
| 5,305,336 | * | 4/1994 | Adar et al. | 372/18 |
| 5,347,533 | * | 9/1994 | Higashi et al. | 372/96 |
| 5,379,318 | * | 1/1995 | Weber | 372/96 |
| 5,841,799 | * | 11/1998 | Hiroki | 372/19 |

FOREIGN PATENT DOCUMENTS

| 59172286 | | 9/1984 | (JP) . | |
|---|---|---|---|---|
| 63-164382 | | 7/1988 | (JP) . | |
| 40-4132284A | * | 5/1992 | (JP) | 372/94 |
| 4-349682 | | 12/1992 | (JP) . | |
| 40-5259538A | * | 10/1993 | (JP) | 372/94 |
| WO87/01246A | | 2/1987 | (WO) . | |
| WO95/25367 | | 9/1995 | (WO) . | |

OTHER PUBLICATIONS

Cheng, Y. et al.; Optics Letters, vol. 20, No. 8; Apr. 1995; pp. 875–877, "Stable single–frequency traveling–wave fiber loop laser with integral saturable–absorber–based tracking narrow–band filter".

Guy, M., et al.; Electronics Letters, vol. 31, No. 22; Oct. 1995; pp. 1924–1925, Single–frequency erbium fibre ring laser with intercavity phase–shifted fiber Bragg gating narrowband filter.

Chao–Xiang Shi, et al.; Journal of Lightwave Technology, vol. 13, No. 9; Sep. 1995; pp. 1853–1857, "Bias of a resonator fiber optic gyro composed of a polarization–maintaining fiber ring resonator with a photoinduced birefringent grating".

(List continued on next page.)

Primary Examiner—Rodney Bovernick
Assistant Examiner—Michael J. Stahl
(74) Attorney, Agent, or Firm—Marshall, O'Toole, Gerstein, Murray & Borun

(57) ABSTRACT

A single longitudinal mode narrow linewidth and low threshold all fiber laser arrangement is disclosed, constructed from a ring cavity, a gain portion in the ring cavity, an input-output coupling interposed within the cavity and pumping means connected to the ring cavity and to the grating such that, upon actuation of the pumping means, the arrangement acts as a laser.

23 Claims, 6 Drawing Sheets

OTHER PUBLICATIONS

Stepanov, D., et al.; Australian conference on optical fibre technology; Dec. 1995; pp. 413–416, "Ring distributed-–feedback fibre laser".

Supplementary European search report dated Nov. 1998.

International search report dated Feb. 24, 1997.

* cited by examiner

DISTRIBUTED FEEDBACK RING LASER

FIELD OF THE INVENTION

The present invention relates to a single frequency laser arrangement and, in particular, to a single longitudinal mode narrow linewidth and low threshold all fibre laser arrangement.

BACKGROUND OF THE INVENTION

Single frequency lasers are particularly useful in optical communication systems, fibre sensors, and spectroscopy as narrow linewidth sources. There has been increasing interest in developing single longitudinal mode fibre lasers.

One approach to obtain single longitudinal mode operation is to use a distributed feedback structure (DFB). As an example, reference is made to H Kogelnik and C V Shank, "Coupled-wave theory of distributed feedback lasers", Journal of Applied Physics vol. 43, no. 5, pp. 2327–2335, 1972. Recently, DFB fibre lasers have been demonstrated, using in fibre gratings directly written into rare earth doped fibres [J. T. Kringlebotn, J-L Archambault, L. Reekie, and D. N. Payne, "$Er^{3+}$:$Yb^{3+}$-codoped fibre distributed-feedback laser", Optics Letters., vol. 19, no. 24, pp. 2101–2103, 1994 and A. Asseh, H. Storoy, J. T. Kringlebotn, W. Margulis, B. Sahlgren, S. Sandgren, R. Stubbe, and G. Edwall, "10 cm $Yb^{3+}$ DFB fibre laser with permanent phase shifted grating", Electron. Letters., vol. 31, no. 12, pp. 969–970, 1995]. Using fibre DFB structures permits all fibre devices and wavelength selectivity over a wide range. However, the use of short pieces of heavily doped fibre has a disadvantage of low slope efficiency and large linewidth. Another approach to obtain single longitudinal mode operation is to use the travelling wave operation of ring fibre lasers [G. J. Cowle, D. N. Payne, and D. Reid, "Single-frequency travelling-wave erbium-doped fibre loop laser", Electron. Letters., vol. 27, no. 3, pp. 229–230, 1991]. Long cavity lengths of ring lasers provide narrow linewidth operation. However, single longitudinal mode operation of ring lasers reported to date has been achieved mostly with pigtailed non-fibre intracavity elements.

Suppression of spatial hole burning by internal modulation of the laser cavity [T. Stolte and R. Ulrich, "Er-fibre lasers: suppression of spatial hole burning by internal modulation", Electron. Lett., vol. 29, no. 19, pp. 1686–1688, 1993] can be used to ensure single longitudinal mode operation. However, it also requires pigtailed non-fibre intracavity elements.

Further, single longitudinal mode narrow linewidth operation can be achieved using injection locking [J. D. C. Jones and P. Urquhart, "An injection-locked erbium fibre laser", Optical Communications., vol. 76 no. 1, pp. 42–46, 1990]. However, this approach requires an external single longitudinal mode narrow linewidth laser.

The disadvantage of using a coupled cavity fibre laser incorporating fibre Bragg gratings [S. V. Chernikov, J. R. Taylor, and R. Kashyap, "Coupled-cavity erbium fibre lasers incorporating fibre grating reflectors", Opt. Letters., vol. 18, no. 23, pp. 2023–2025, 1993] or Fox-Smith fibre lasers [P. Barnsley, P. Urquhart, C. Millar, and M. Brierley, "Fiber Fox-Smith resonators: application to single-longitudinal-mode operation of fibre lasers", Journal of the Optical Society of America vol. 5, no. 8, pp. 1339–1346, 1988] is that these approaches require several perfectly matched gratings, although the approaches permit all fibre devices.

A saturable absorber [M. Horowitz, R. Daisy, B. Fischer, and J. Zyskind, "Narrow-linewidth, singlemode erbium-doped fibre laser with intracavity wave mixing in saturable absorber", Electron. Letters., vol. 30, no. 8, pp. 648–649, 1994] can be used to achieve single longitudinal mode narrow linewidth operation. However, the absorber increases the lasing threshold and reduces slope efficiency of the laser.

SUMMARY OF THE INVENTION

It is an object of the present invention to provide an improved laser arrangement which overcomes some of the disadvantages of the aforementioned laser arrangements.

In accordance with the first aspect of the present invention there is provided a laser arrangement which comprises a ring cavity with a gain portion, an input-output coupling connected to the ring cavity, a grating interposed in the gain portion of the ring cavity, and a pumping means connected to the gain portion of the ring cavity and the grating, such that, upon activation of the pumping means, the laser arrangement operates as a laser and produces an output at said input-output coupling.

Preferably, the ring cavity and grating are formed from the one piece of rare earth doped optical fibre with the grating being written directly into the optical fibre.

Preferably, the laser arrangement acts as a distributed feedback structure for obtaining a single longitudinal mode of operation over a frequency linewidth of less than 70 kHz.

In broad terms, the preferred embodiment of the present invention provides a single longitudinal mode narrow linewidth and low threshold laser, comprising a distributed feedback structure inserted into a ring cavity.

More specifically, the preferred embodiment of the present invention provides a single longitudinal mode narrow linewidth and low threshold laser arrangement, comprising a distributed feedback structure for obtaining single longitudinal mode operation, and an output coupler to provide output coupling and additional feedback through the ring cavity. The additional feedback of the lasing signal via the ring cavity decreases the lasing threshold because of the reduction in effective resonator losses. The additional feedback also leads to laser linewidth narrowing provided by self injection of the lasing signal through the ring cavity which can be considered as an extended cavity.

In a preferred embodiment the distributed feedback structure is a grating written into an $Er^{3+}$:$Yb^{3+}$-doped phosphosilicate fibre with a transmission peak within the corresponding photonic bandgap. Splicing of this structure within a ring cavity has resulted in a single longitudinal mode operation at the transmission peak wavelength. Such an arrangement has advantages in producing single longitudinal mode narrow linewidth and low threshold laser sources in optical communication systems, fibre sensors, and spectroscopy.

BRIEF DESCRIPTION OF THE DRAWINGS

Features and advantages of the present invention will become apparent from the following description of embodiments thereof, by way of example only, with reference to the accompanying drawings, in which.

DETAILED DESCRIPTION OF THE PREFERRED EMBODIMENT

Figure 1:
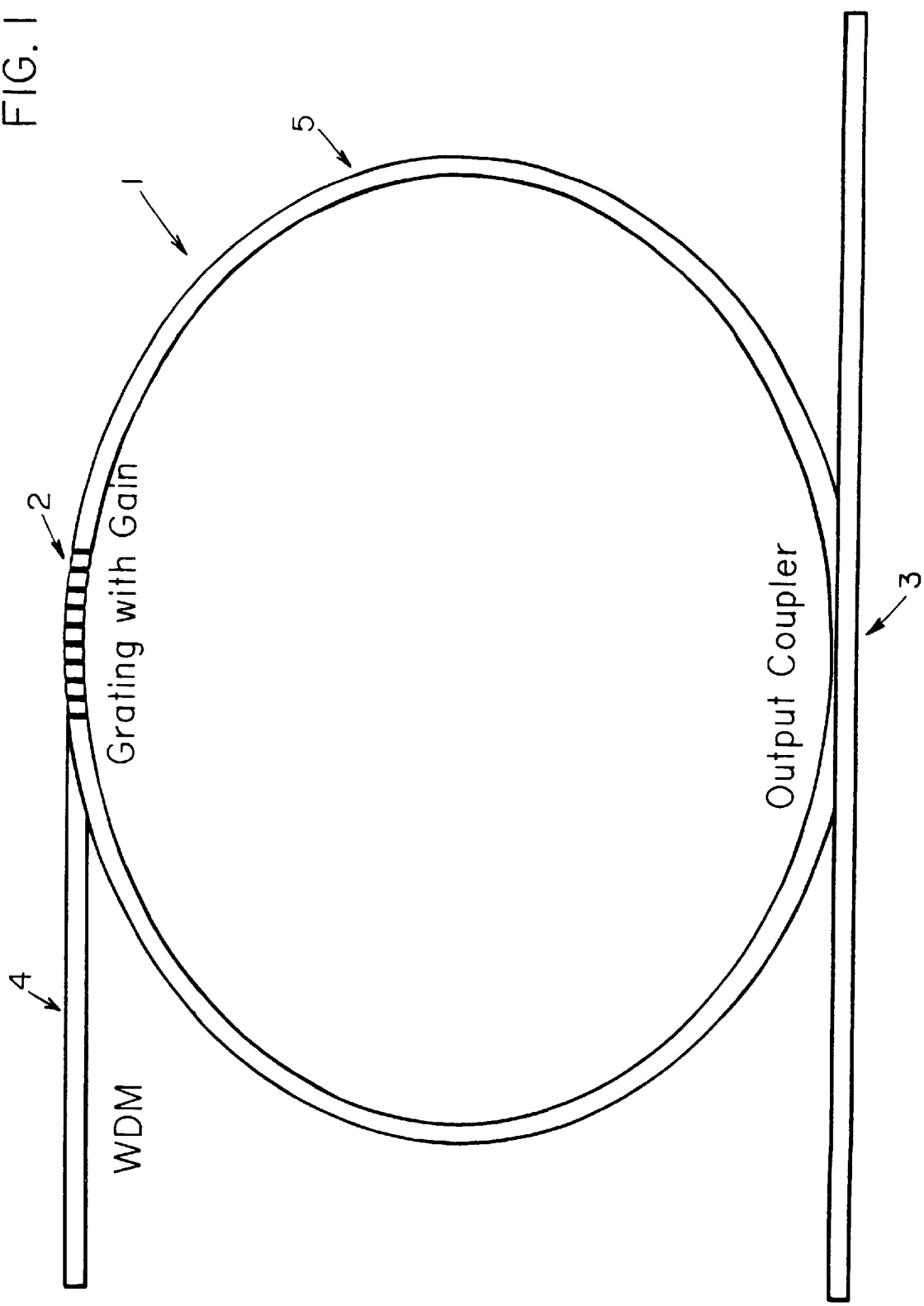
FIG. 1 is a schematic diagram of a laser arrangement in accordance with an embodiment of the present invention.

FIG. 1 schematically illustrates a ring DFB laser arrangement 1 comprising a DFB structure 2 coupled to itself via a ring cavity 5. The arrangement also comprises an output coupler 3 to provide output coupling and to complete the ring. A wavelength division multiplexing (WDM) fibre coupler 4 is coupled to and provides optical pumping of the DFB structure 2.

Figure 2:
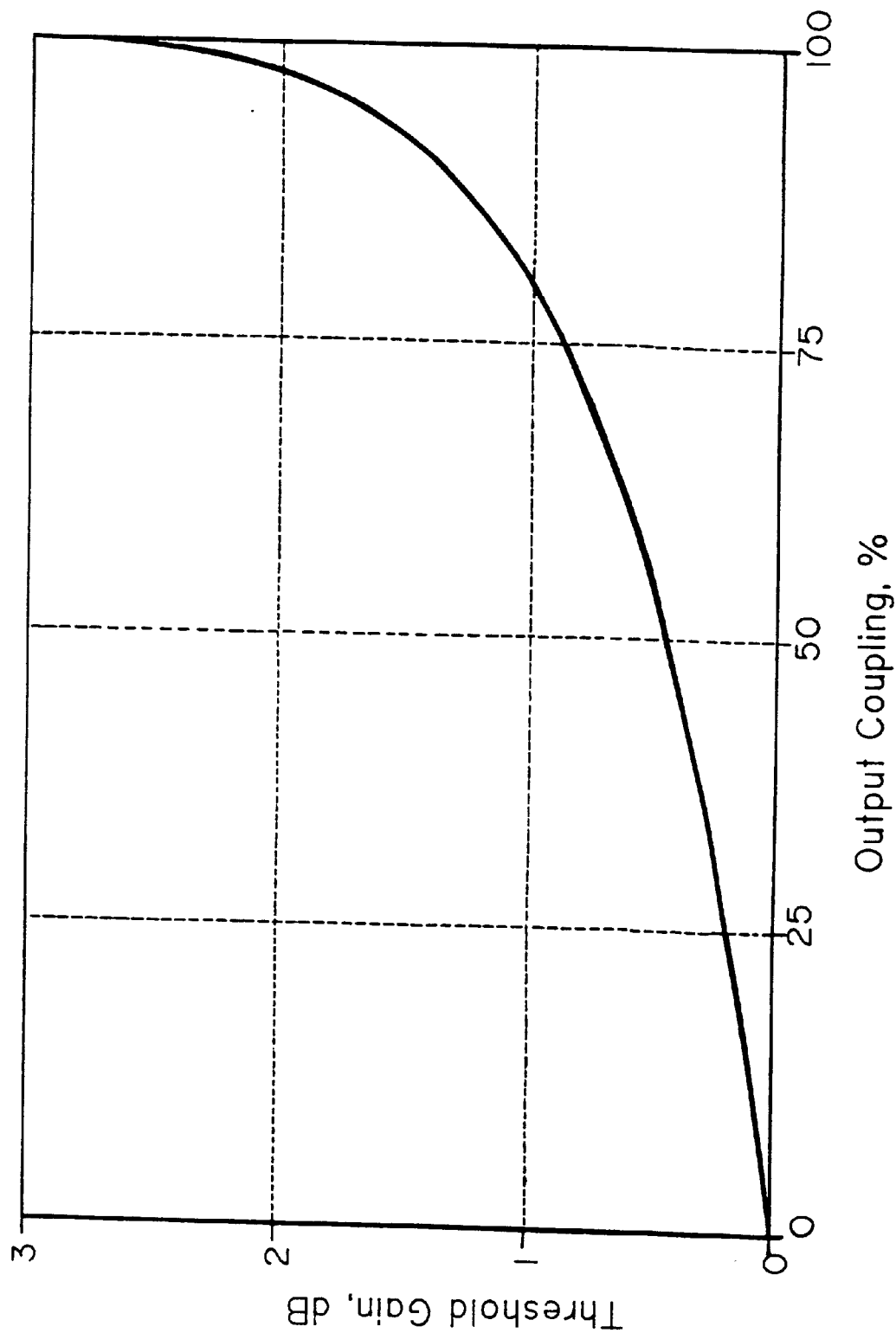
FIG. 2 shows the calculated single pass gain threshold of the laser vs output coupling for grating strength $\kappa L = 2\pi/3$ and uniform gain in a DFB structure.

The ring cavity 5 provides additional feedback to the lasing signal of the DFB structure 2. This feedback decreases the lasing threshold compared to the traditional DFB laser because of the reduction in the DFB structure losses to output. To determine the efficiency arising from the feedback, the predicted lasing threshold of the $\lambda/4$-shifted DFB structure within the ring as a function of coupling ratio of the output coupler is plotted in FIG. 2 for a grating strength $\kappa L = 2\pi/3$, assuming uniform gain along the grating. It can be seen that a considerable reduction in the threshold can be achieved with only half of the DFB structure output re-injected via the ring 5. The pump threshold, which depends on a doped fibre and pump employed, can be improved further by optimizing the output coupler 3 at the pump wavelength.

In a first example, $Er^{3+}/Yb^{3+}$-doped phosphosilicate fibre (1 wt. % $Er_2O_3$, 10 wt. % $Yb_2O_3$, 33 wt. % $P_2O_5$) was produced by the flash condensation technique [A. L. G. Carter, M. G. Sceats, S. B. Poole, "Flash condensation technique for the fabrication of high phosphorous-content rare-earth-doped fibres", Electron. Letters., vol. 28, no. 21 pp. 2009–2011, 1992], and was used to form the arrangement 1. A saturated gain measurement at 1535 nm was about 0.8 dB/cm when measured with a 980 nm pump laser diode. A 3 cm long grating 2 with reflection R>99% was fabricated by exposing a hydrogenated sample (100 atm, 373K) to the 193 nm output of an ArF excimer laser through a 1535 nm phase mask. The grating 2 was then pumped with a 980 nm pump laser diode through a 980/1550 WDM 4 located in the ring.

Figure 3:
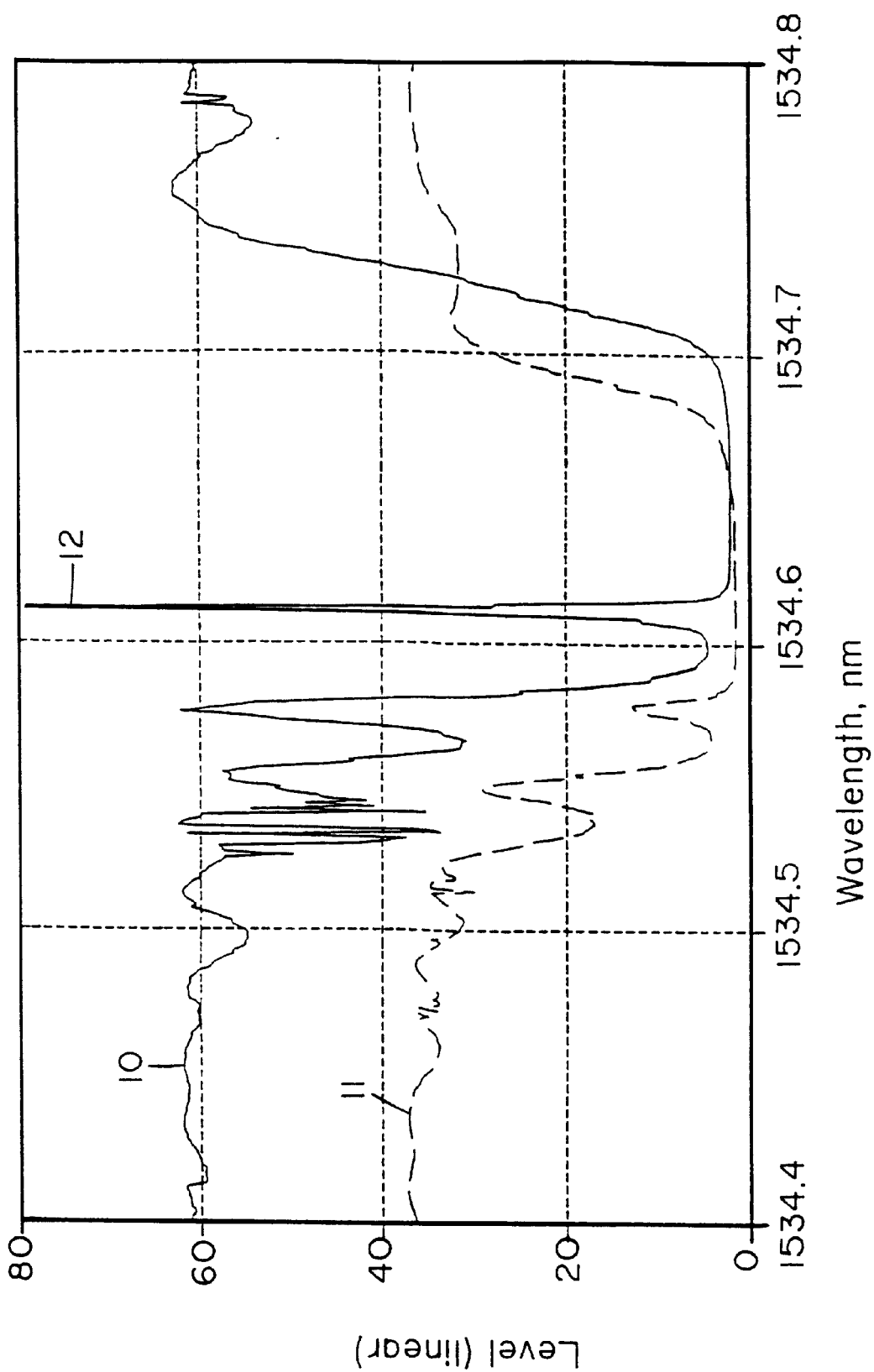
FIG. 3 is a DFB transmission spectrum with (solid line) and without (dashed line) pumping, wherein the DFB structure employed is a grating written into an $Er^{3+}$/$Yb^{3+}$-doped phosphosilicate fibre.
Figure 4:
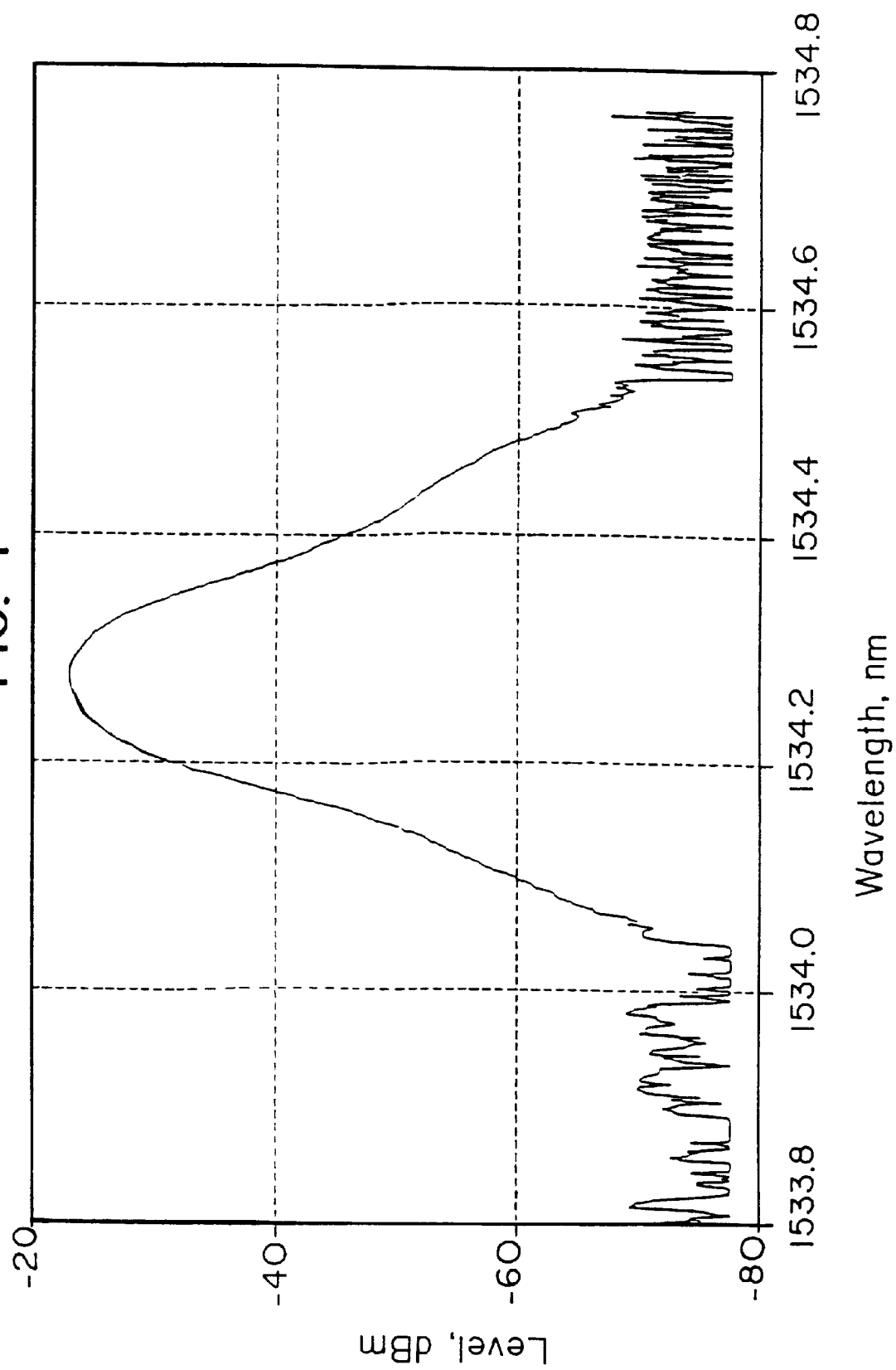
FIG. 4 is an optical spectrum of the laser arrangement of FIG. 1, measured by a monochromator (0.1 nm resolution)

FIG. 3 shows a graph of the resulting transmission spectrum of the grating 2 with pumping 10 and without pumping 11, using a narrow linewidth tunable semiconductor laser source with a 0.001 nm setting accuracy. The coupling coefficient was estimated from the transmission spectrum of the grating to be $\kappa L \approx 3$. As can be seen from FIG. 3, when pumping the grating 2, the centre wavelength generally shifts to longer wavelengths with the simultaneous appearance of the transmission peak 12 within the photonic bandgap at a certain pump intensity. In the present case, splicing of the DFB structure 2 within the ring with 1% output coupling led to lasing at the transmission peak wavelength, the optical spectrum of which is shown in FIG. 4, when utilising a threshold pump power of approximately 10 mW. It should be noted from FIG. 4 that side mode suppression was more than 50 dB.

Figure 5:
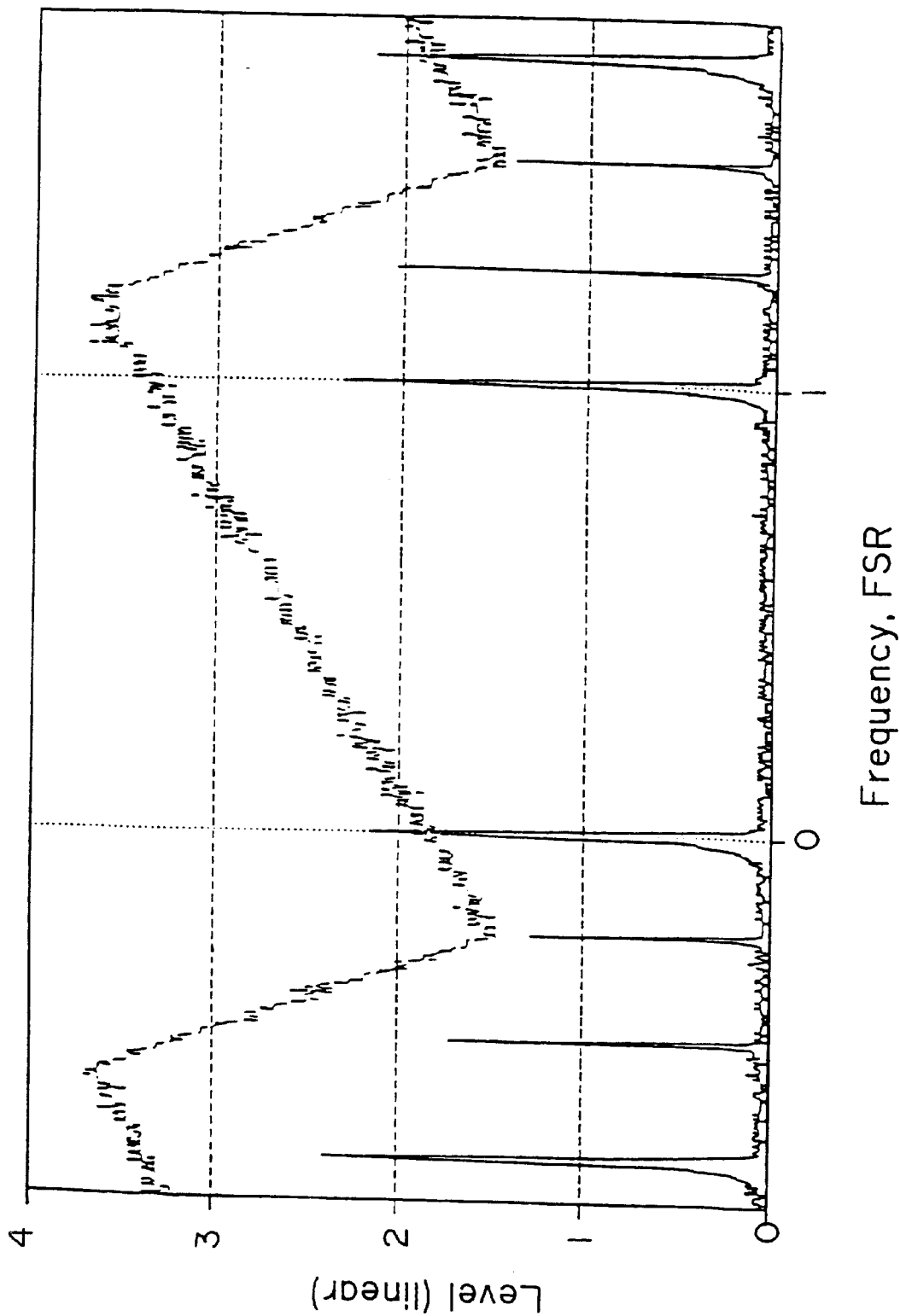
FIG. 5 shows an output spectrum of the laser arrangement of FIG. 1, measured by scanning Fabry-Perot interferometer 5 MHz resolution)
Figure 6:
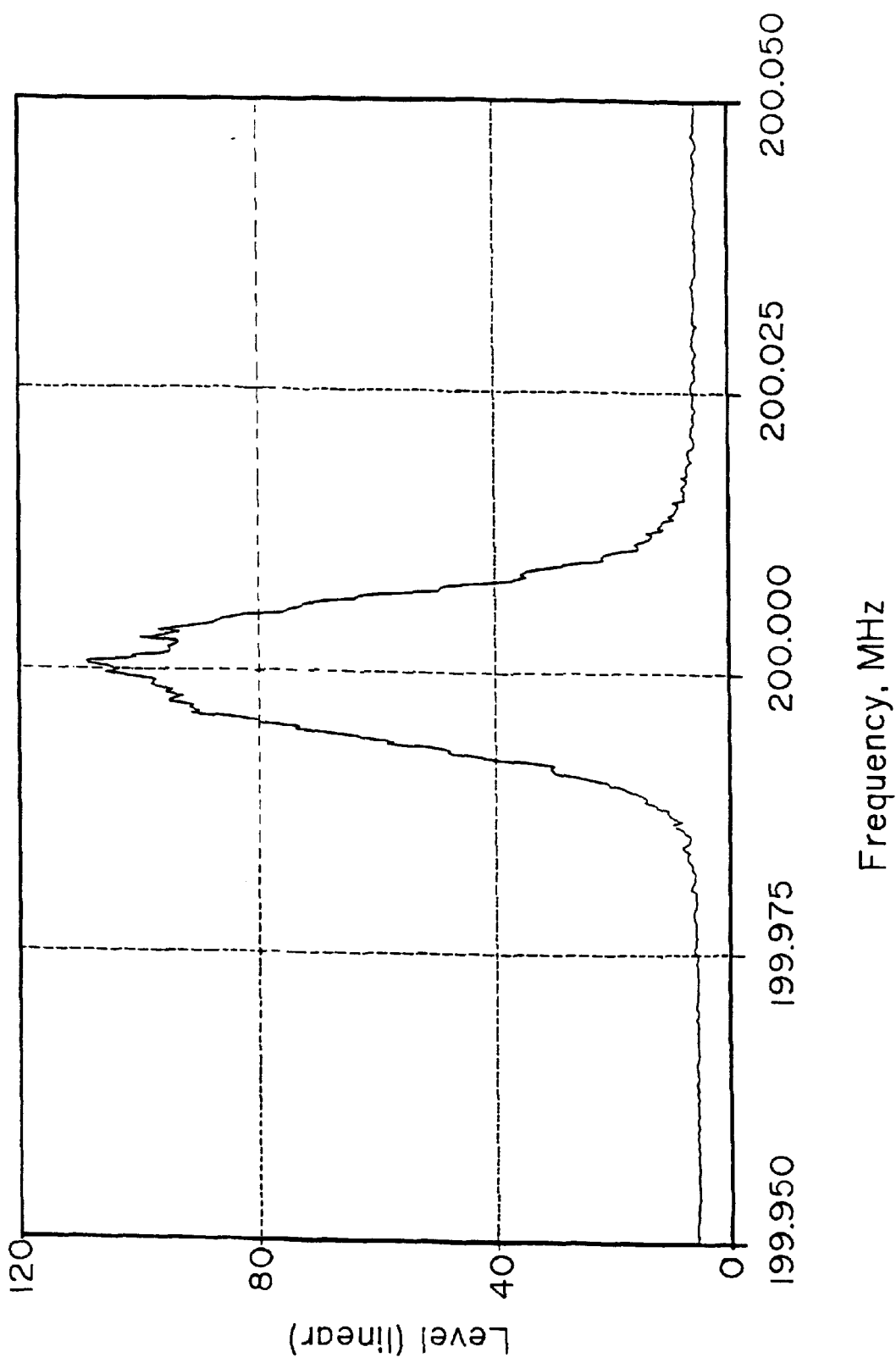
FIG. 6 is spectral linewidth of the laser arrangement of FIG. 1, measured by delayed self-heterodyne technique (5 kHz resolution).

Lasing was found to be robustly in a single longitudinal mode, confirmed using a scanning Fabry-Perot interferometer. FIG. 5 shows the longitudinal mode spectrum of the laser output, while FIG. 6 shows the linewidth of the ring DFB laser that was measured to be 6.5 kHz using a conventional self heterodyne technique with a 20 km delay line.

The above arrangement 1 has a potential tunability over a wide wavelength range by tuning the centre wavelength of the grating and/or transmission peak within the photonic bandgap of the grating.

It will be appreciated that the present invention is not limited to an all fibre arrangement and that other distributed feedback structures and ring cavities may be employed.

It will be further appreciated that the present invention is not limited to a $\lambda/4$ shifted distributed feedback structure and that other distributed feedback structures both gain and/or index modulated, and/or with complex modulation profiles, such as sampled Bragg grating structures or chirped Bragg grating structures, may be employed.

When complex distributed feedback structures are employed, it can be appreciated that the laser configuration is able to generate dual or multiple laser modes each of which will have low-threshold, stable and narrow-linewidth operation similar to that of the single-mode ring DFB laser.

It will be further appreciated that other dopants apart from erbium may be used in the distributed feedback structure.

It will be appreciated by persons skilled in the art that further variations and/or modifications may be made to the invention as shown in the specific embodiment without departing from the spirit or scope of the invention as broadly described. The present embodiment is, therefore, to be considered in all respects as illustrative and not restrictive.

What is claimed is:

1. A distributed feedback ring laser arrangement comprising:
   a ring cavity;
   a gain portion in said ring cavity;
   an input coupling connected to said ring cavity;
   an output coupling connected to said ring cavity;
   a grating interposed within the gain portion of said ring cavity; and
   an optical pumping means connected to said grating within said gain portion of said ring cavity such that upon activation of said optical pumping means, said laser arrangement operates as a distributed feedback ring laser producing a laser output at said output coupling.

2. A laser arrangement as claimed in claim 1 wherein said ring cavity comprises an optical fibre.

3. A laser arrangement as claimed in claim 2 wherein said optical fibre has a rare earth doped core.

4. A laser arrangement as claimed in claim 3 wherein said grating comprises a Bragg grating directly written into said optical fibre.

5. A laser arrangement as claimed in claim 3 wherein said rare earth is erbium.

6. A laser arrangement as claimed in claim 1 wherein said grating is arranged to obtain single longitudinal mode operation of said laser.

7. A laser arrangement as claimed in claim 1 wherein said ring cavity provides a reduced threshold and provides linewidth narrowing of said laser.

8. A laser arrangement as claimed in claim 7 wherein the linewidth of said laser is less than 70 kHz.

9. A laser arrangement as claimed in claim 1 wherein said laser is tuned to a predetermined frequency by tuning of said grating.

10. A laser arrangement as claimed in claim 1 wherein said ring cavity has a $\lambda/4$ shifted distributed feedback structure.

11. A laser arrangement as claimed in claim 1 wherein said grating is a chirped Bragg grating.

12. A laser arrangement as claimed in claim 1 wherein said grating is a sampled Bragg grating.

13. A distributed feedback ring laser arrangement comprising:
 a ring cavity;
 a gain portion in said ring cavity;
 an input coupling connected to said ring cavity;
 an output coupling connected to said ring cavity;
 a grating interposed within the gain portion of said ring cavity; and
 a pumping means connected to said grating within said gain portion of said ring cavity such that upon activation of said pumping means, said laser arrangement operates as a distributed feedback ring laser producing a laser output at said output coupling;
 wherein said ring cavity and said grating comprise an optical fibre.

14. A laser arrangement as claimed in claim 13 wherein said optical fibre has a rare earth doped core.

15. A laser arrangement as claimed in claim 13 wherein said grating comprises a Bragg grating directly written into said optical fibre.

16. A laser arrangement as claimed in claim 14 wherein said rare earth is erbium.

17. A laser arrangement as claimed in claim 13 wherein said grating is arranged to obtain single longitudinal mode operation of said laser.

18. A laser arrangement as claimed in claim 13 wherein said ring cavity provides a reduced threshold and provides linewidth narrowing of said laser.

19. A laser arrangement as claimed in claim 18 wherein the linewidth of said laser is less than 70 kHz.

20. A laser arrangement as claimed in claim 13 wherein said laser is tuned to a predetermined frequency by tuning of said grating.

21. A laser arrangement as claimed in claim 13 wherein said ring cavity has a $\lambda/4$ shifted distributed feedback structure.

22. A laser arrangement as claimed in claim 13 wherein said grating is a chirped Bragg grating.

23. A laser arrangement as claimed in claim 13 wherein said grating is a sampled Bragg grating.

* * * * *